United States Patent [19]
Perry

[11] 3,864,250
[45] Feb. 4, 1975

[54] LIQUID-SOLID ADSORPTION CHROMATOGRAPHY

[75] Inventor: John A. Perry, Chicago, Ill.

[73] Assignee: Regis Chemical Company, Morton Groove, Ill.

[22] Filed: Mar. 16, 1973

[21] Appl. No.: 342,195

[52] U.S. Cl. .......................... 210/31 C, 210/198 C
[51] Int. Cl. ............................................. B01d 15/08
[58] Field of Search ............ 210/31 C, 71, 138, 175, 210/198; 55/67

[56] References Cited
UNITED STATES PATENTS

| | | | |
|---|---|---|---|
| 3,187,486 | 6/1965 | Dinelli et al. | 55/67 |
| 3,342,333 | 9/1967 | Geiss et al. | 210/31 C |
| 3,474,031 | 10/1969 | Blondell | 210/138 X |
| 3,600,306 | 8/1971 | Tocci | 210/198 C |
| 3,623,841 | 11/1971 | Kraffczyk et al. | 210/31 C |
| 3,667,917 | 6/1972 | Brandt | 210/31 C |
| 3,692,669 | 9/1972 | Bauman | 210/31 C |

OTHER PUBLICATIONS

Thin-layer Chromatography An Annotated Bibliography: 1964–1968 by B. J. Haywood, Ann Arbor Science Publishers, Ann Arbor Mich. 1968, pages 24, 76, 102, and 135 relied on.

Primary Examiner—John Adee
Attorney, Agent, or Firm—Gary, Juettner, Pigott & Cullinar

[57] ABSTRACT

The speed, range, efficiency and resolution of liquid-solid adsorption chromatography, especially thin layer chromatography, are improved by use of heat to increase the diffusivity and/or to control movement of solvent in the adsorbent bed, with or without the conjoint increase or reduction of pressure over the bed to control the degree of evaporation of the solvent from the bed. In the various embodiments, both heat and pressure may be varied to achieve the desired improvement, and the variations may be cyclical.

44 Claims, 12 Drawing Figures

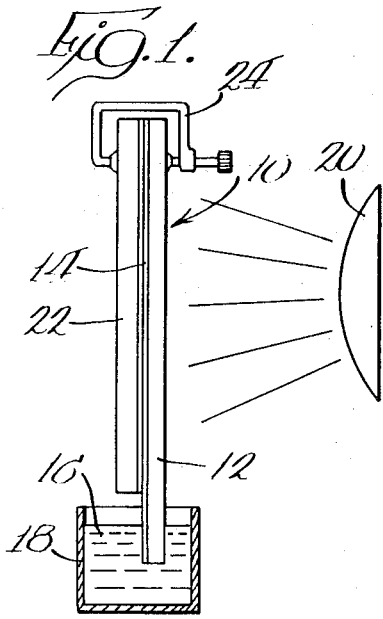
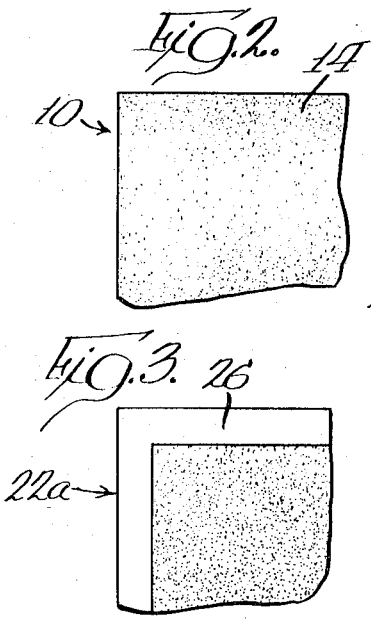
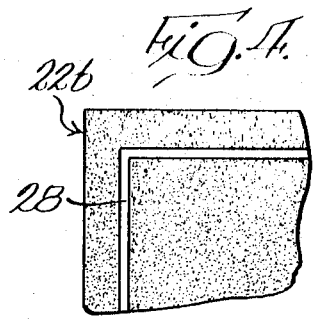
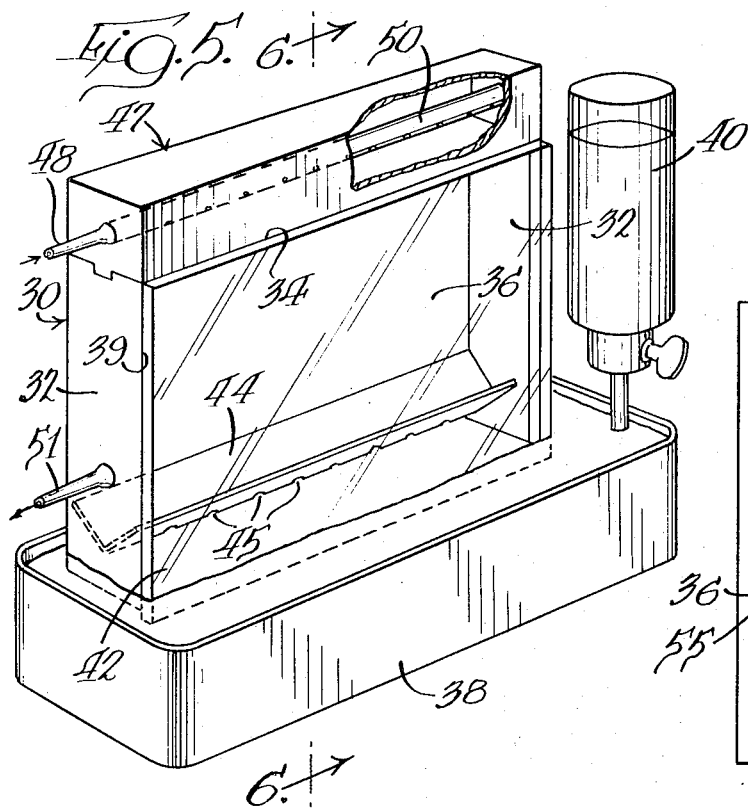
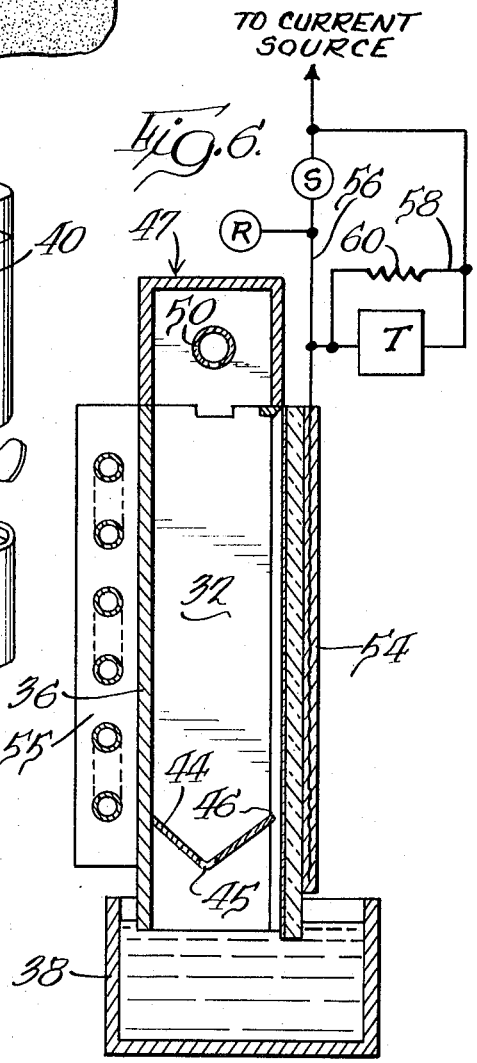

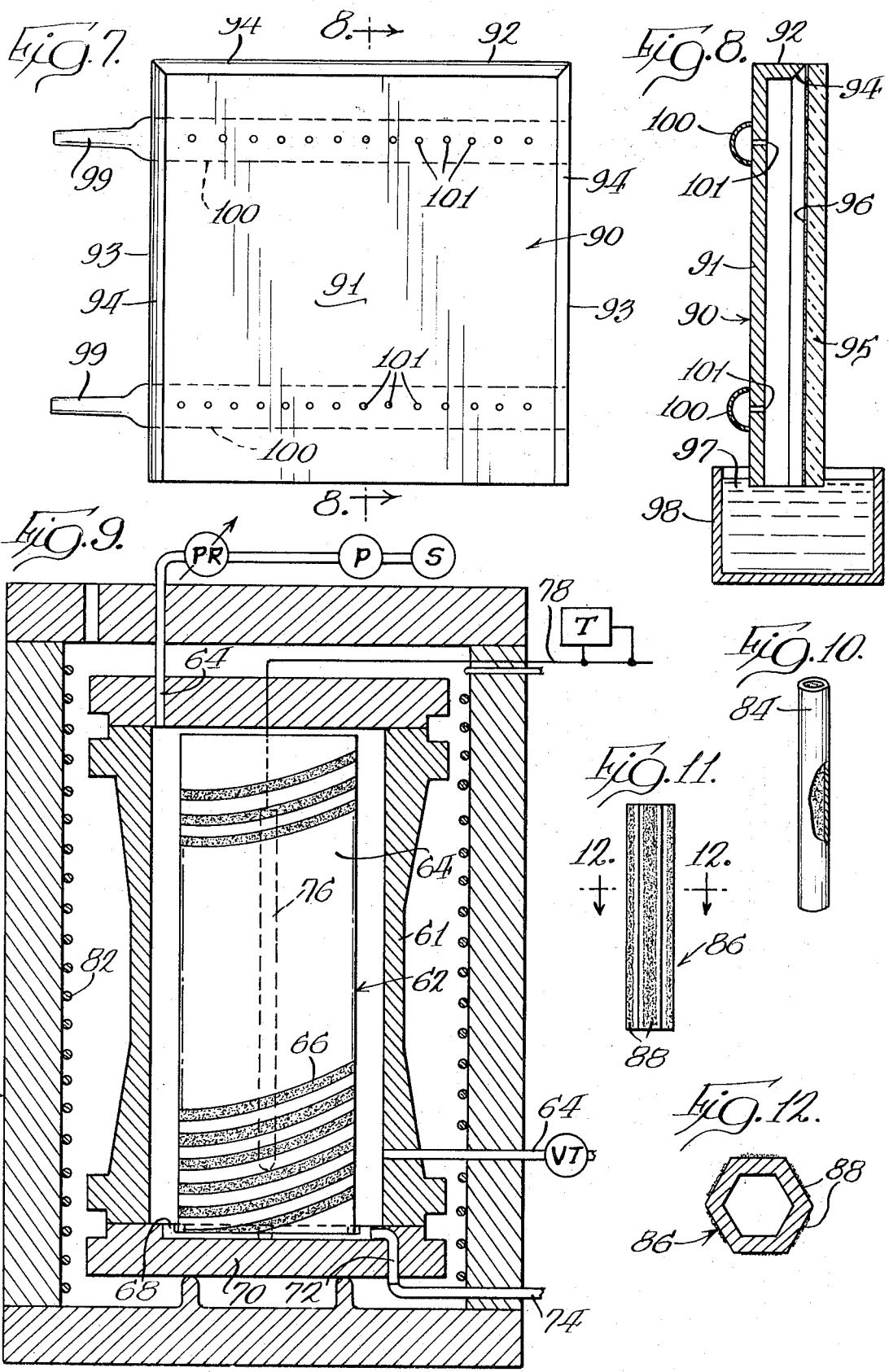

LIQUID-SOLID ADSORPTION CHROMATOGRAPHY

BACKGROUND OF THE INVENTION

This invention relates to chromatography or methods of spatially separating different chemical components carried by a liquid in an adsorbent bed. The invention has particular applicability to a technique known as thin layer chromatography.

Thin layer chromatogrphy typically utilizes a smooth non-porous plate onto which a thin uniform layer or bed of adsorbent, such as silica gel, is applied. The silica gel on the plate is known as the stationary phase. The material to be separated on the plate is usually a mixture of several components. A solution of the material is applied as a spot onto the plate near one edge thereof, allowed to dry, and the edge of the plate adjacent the spot is immersed in a suitable solvent (called the mobile phase).

Upon immersion of the edge, the solvent moves into the adsorbent bed by capillary forces and encounters the material sample. Under favorable circumstances, continued movement of the solvent together with the sample causes the plate to develop, whereby the various components are absorbed in spaced spots on the plate, and each spot contains one or fewer than all of the components. After the solvent has been evaporated from the plate, the various spots may be individually analyzed by qualitative or quantitative methods. Conventional thin layer separations are usually carried out at ambient or room temperatures.

The efficiency, speed and resolution of thin layer separations are limited in comparison with theoretical possibilities. The solvent moves by capillary forces and the speed of the solvent advance is inversely proportional to the distance of solvent front advance from the reservoir. As a result, most separations of any value require at least an hour, and the separation efficiency is quite low, usually in the order of 500 theoretical plates on a 20 cm bed, which compares unfavorably with 50,000 theoretical plates routinely attainable in gas-liquid chromatography.

SUMMARY OF THE INVENTION

The present invention provides a means for greatly improving the range, speed and efficiency of thin layer chromatography by using heat to control movement of solvent in the adsorbent bed. Pressure may also be used to control evaporation of the solvent from the bed, which in one embodiment, allows greater application of heat without prohibitive evaporation of the solvent.

I have found that diffusion within the solvent or mobile phase is a limiting factor in thin layer chromatography. The diffusivity of the mobile phase is increased exponentially by a linear increase in temperature, which results in a vastly greater speed of development with an accompanying increase in resolution. At higher temperatures, a pressure vessel may be employed to prevent evaporation of the solvent until the development has occurred.

I have also discovered that results heretofore not attainable by conventional thin layer chromatography may be achieved by varying one or both the temperature and pressure, for example, by (i) evaporating the solvent from the bed completely and repetitively thus accomplishing multiple developments, conveniently, quickly and efficiently, (ii) oscillating or regressing the advance of the solvent front, particularly in a zone closely adjacent to the solvent reservoir to attain better resolution and concentration of spots, and (iii) establishing timed cyclical sequences of solvent removal and solvent advance, in which the time between sequences is variable or constant to achieve greatly improved separations.

THE DRAWINGS

FIG. 1 is a side view, partly in cross section, of apparatus used in connection with the present invention;

FIGS. 2, 3 and 4 are fragmentary elevational views of various types of thin layer plates used in connection with the apparatus of FIG. 1;

FIG. 5 is a perspective view of a chamber device that may be employed in the practice of the present invention;

FIG. 6 is a cross sectional view taken substantially along section line 6—6 of FIG. 5;

FIG. 7 is an elevational view of a more simplified version of the chamber device shown in FIG. 5;

FIG. 8 is a cross sectional view of the apparatus shown in FIG. 7, taken substantially along section line 8—8 thereof;

FIG. 9 is an elevational view, partly in cross section, of a pressure device used in the practice of another embodiment of the present invention;

FIG. 10 is an elevational view, partly in section, of a tube containing absorbent that may be used in the FIG. 9 device;

FIG. 11 is a multi-surface thin layer plate that may be used in connection with the present invention; and FIG. 12 is a cross sectional view taken along section line 12—12 of FIG. 11.

DESCRIPTION OF THE PREFERRED EMBODIMENTS

In the first and simplest embodiment of the invention, the development of the plate is carried out in the normal manner, except a substantially constant source of heat is applied to the plate during a single development, i.e., a single advance of solvent through the plate adsorbent until the desired degree of separation is attained. The temperature of the plate is preferably maximized up to a level slightly above or near the boiling point of the solvent to prevent excessive loss of solvent from the plate by evaporation, which would in turn prevent the solvent from advancing by normal capillary action. It will be understood, however, that beneficial results will be obtained if the solvent in the plate is heated to any temperature above ambient, with the benefits increasing with temperature increase.

FIGS. 1-4 illustrate apparatus that may be employed to carry out the first embodiment of the invention. As shown in FIGS. 1 and 2, standard thin layer plate 10 may be employed for the development, the plate comprising a square or rectangular sheet of glass or other nonabsorbent material 12, with a thin coating of adsorbent 14 thereon, as is conventional in thin layer chromatography. Various types of well known adsorbents may be employed, the standard in current use being a silica gel layer of 250 micrometers in thickness with a particle diameter in the order of 15 micrometers. As will be hereinafter explained, the present invention also allows for the use of adsorbents having particle sizes of less than 2 micrometers. Another adsorbent which may be employed is alumina.

In developing the plate 10, a small sample of a mixture, usually about 1 microliter of a 1% solution or 10 micrograms, is deposited on the adsorbent as a spot of minimal diameter located about 1 centimeter from the lower edge of the plate or from the surface of the solvent in the reservoir. When the spot has dried, the edge of the plate adjacent to the spot is immersed in a suitable reservoir of liquid or solvent 16 held in a tank 18, with the spot being about 1 cm above the reservoir level. Many types of solvents may be employed and include, without limitation, n-pentane, benzene methanol, and water. Conventionally, a solvent of lower viscosity is preferred because solvents of higher viscosities advance too slowly in the adsorbent, excessive times for development are required, and the solvent cannot be conveniently removed from the plate after development. The greater the viscosity at ambient temperature, the more dramatic its decrease in viscosity with increase in temperature.

After the edge of the plate has been immersed in the solvent, the solvent advances upward in the thin adsorbent layer by capillary forces. The advancing solvent encounters the sample and carries with it components of the sample mixture, and under favorable conditions, the various components of the mixture separate on the plate in a line of discrete and spaced spots.

I have found that two major factors inhibit the efficiency of plate development in thin layer chromatography when carried out at ambient temperatures. At any given temperature, there is an optimum velocity of solvent flow in the adsorbent layer, i.e., that rate of flow which provides the best efficiency of separation. If the mobile phase did not move, then the components of the sample would merely diffuse through it with the result of infinite spreading without separation. If the mobile phase velocity is too high, the sample components are moved through the bed before the molecules of a given component can diffuse uniformly to some part of the stationary phase, with the result that the spots become too wide and do not separate mutually. Conventional thin layer separations normally exhibit higher than optimum solvent velocity, with the result that the solvent must travel a farther distance to achieve complete separation and the spots tend to become far too wide, thus wasting plate distance and experimental time.

From the foregoing, it may be seen that the desiderata in conventional thin layer chromatography are often conflicting. Achievement of an optimum rate of flow would apparently involve decreasing the conventional flow rate, whereas the use of the total plate surface within a more reasonable time would require increasing the rate of solvent flow.

I have discovered that if the diffusivity of the solvent or mobile phase is increased by heating the solvent within the adsorbent, the speed, resolution and efficiency of the separation are greatly increased, with a proportional increase in allowable optimum velocity. Heating of the solvent exponentially increases its diffusivity and reduces its viscosity, and the ambient viscosity of the solvent and the particle size of the adsorbent therefore become less limiting to achievable resolution within a reasonable time.

Due to the vast increase in solvent diffusivity because of heating, the particle diameter of the bed may be decreased for better quality separations without significant loss of development. I have found that a reduction of particle size diameter of the adsorbent to 2 microms or less will improve resolution by decreasing the forward optimal flow rate.

Various means may be used to heat the plate 10. As shown in FIG. 1, a radiant heater 20 which is spaced from the uncoated side of the plate may be employed, or the plate may contain an internal resistance heater. After the plate edge is immersed in the solvent, heat is applied until the solvent has advanced for the desired distance. The plate may then be removed from the reservoir upon completion of development, and any solvent remaining in the plate allowed to evaporate.

During development of the plate, it is preferable to form some type of enclosure above the adsorbent surface, in order to maintain a solvent-saturated atmosphere above the plate and prohibit nonuniform or prohibitive evaporation. For this purpose, as shown in FIG. 1, a second porout plate 22 may be held into contact with the first by means of clamps 24 or the like during the development. The second plate 22 may be a thin layer plate identical to the first with the porous surfaces of the plates in contact, except that the second plate does not extend down into the solvent reservoir but is spaced thereabove. Heat is applied in this case from the side of the first plate in order that solvent will not condense thereon ahead of the line of solvent advance.

As shown in FIGS. 3 and 4, it is preferable that one or both of the plates 10 and 22 have a non-porous barrier line around the edge. This may be provided simply by scraping off a border of the silica gel or other adsorbent around a margin 26 of the plate 22a to expose the non-porous glass surface (FIG. 3). In the alternative, a continuous nonporous border line 28 may be provided adjacent the edges of the plate 22b (FIG. 4). The purpose of the barrier is to prevent migration of liquid from the edges into the main adsorbent bed, which might cause solvent to enter the bed ahead of the front and prevent the spots from developing in a straight line.

A more elaborate version of a chamber is shown in FIGS. 5 and 6. A chamber 30 may be provided to fit the planar border of a thin layer plate and may have inlets and outlets to control the internal atmosphere. Since most plates are rectangular, a rectangular chamber 30 is provided comprising spaced parallel end walls 32, top wall 34 and rear wall 36. The chamber 30 is open at its front face to accommodate the side and top edges of the thin layer plate. The bottom of the chamber is also open to accommodate insertion of the lower portion of the chamber, together with attached plate, into a solvent reservoir 38. A head of contained solvent in a suitable container 40 is in communication with the reservoir to maintain a constant level of liquid therein. Preferably, the chamber is formed of glass plate and the outwardly facing edge surfaces 39 are frosted to allow capillary flow of the solvent between the plate and the edges. The edges are also preferably beveled inward to present a wider surface of solvent to the enclosed inner space.

As shown in FIG. 6, a thin layer plate 42 is brought into engagement with the facing edges of the chamber 30 to form a enclosure, the plate edges being held against the chamber by suitable clamps or the like (not shown). The bottom edge of the chamber and plate are then immersed in the solvent, as shown, to commence the development. Preferably, a vapor barrier is provided between the reservoir and the chamber interior, and said barrier may take the form of a V-shaped trough 44 extending within the chamber generally parallel to the top wall 34 near the bottom of the chamber but above the liquid level in the reservoir. The trough has a plurality of small openings 45 located in the bottom thereof to allow drainage of condensed solvent vapors from the chamber back to the reservoir. The free edge 46 of the barrier adjacent the porous surface of the plate 42 is slightly spaced from said surface to prevent damage to the plate and to prevent interference with normal capillary flow through the bed. The primary purpose of the barrier is to prevent excessive solvent vapors from entering the chamber during a change of atmosphere within the chamber, as will be hereinafter described.

Means are provided for flushing the chamber with a gas or for changing the composition of said atmosphere. For this purpose, an enclosed secondary chamber 47 is provided above the main chamber 30 and in fluid communication therewith, said secondary chamber having an inlet port 48 connected to an apertured distributor pipe 50 extending the length of the secondary chamber above the top edge of the plate 42. Outlet ports 51 are provided in the primary chamber above and near the barrier 44.

The inlet and outlet ports 48 and 51 are provided for distributing or removing gases and vapors from the interior of the chamber in a uniform manner without gross channeling of gas flow, especially near the plate surface. The ports may be employed to flush the chamber with oxygen free gases, such as nitrogen, in order to prevent oxidation of the sample during development. The ports may also be used to rapidly flush vapors from the chamber interior and thereby cause a controlled and/or rapid evaporation of the solvent from the plate when desired. Slight decreases in pressure may also be employed to increase evaporation of the solvent and removal of solvent from the plate.

As shown in FIG. 6, the plate 42 contains or is coated with a metal resistance element 54, which is connected by a line 56 to a source of current that may include a power regulator R. A flow of current to the plate will cause the plate to be heated and will thereby heat the solvent within the porous bed. It will be noted that the lower edge of the heating element 54 is preferably spaced above the surface of the solvent in the reservoir so as not to heat the solvent appreciably until it has entered the porous bed. In the alternative, a radiant heater may be employed as shown in FIG. 1. Also, the heating elements may be designed to heat the plate in a non-uniform manner, such as an element which progressively provides additional heat toward the top of the plate.

As shown in FIG. 6, the rear wall 36 of the chamber 34 may be in contact with a cooling chamber 55 containing suitable cooling coils 57 or the like. The purpose of the cooling chamber 55 is to create or increase a temperature differential between the plate surface and the chamber wall. Cooling of the chamber may be advantageously employed, when desired, to increase the rate of evaporation of solvent from the relatively hot plate while condensing solvent vapors on the rear wall.

FIGS. 7 and 8 illustrate a more simplified version of the apparatus shown in FIGS. 6 and 7. An enclosure 90 of limited depth is provided comprising a rear wall 91, and a narrow top wall 92 and parallel side walls 93 extending outwardly with their free edges 94 exposed in the same plane to form a shallow cup-shaped structure that is open at its bottom. The structure may be formed of glass plate, in which case the edges 94 are beveled inward and are frosted as in the previous version. The edges 94 thus accommodate the top and side edge portions of a thin layer plate 95 having the usual coating of adsorbent 96 facing the interior of the chamber, the lower edge thereof being inserted into a reservoir of solvent 97 held in a suitable vessel 98 (FIG. 8).

The enclosure is provided with inlet or outlet fittings 99 near the top and bottom thereof, said fittings being connected to axially cut tube segments 100 sealed along their edges across the width of the rear wall 91. A plurality of apertures 101 is provided in the rear wall within the confines of both of the tube segments 100 to allow flow of gases into and out of the chamber. It will be noted that the present version does not include a vapor barrier, which is generally not required if the depth of the enclosure is limited to approximately one-half inch or less.

In the second embodiment of the invention, the process described in the first embodiment is repeated for a plurality of times to obtain multiple development of the plate. An important feature of this embodiment is that multiple development is or may be carried out in situ, i.e., with apparatus left intact with the thin layer plate immersed in the solvent.

The second embodiment is very easily accomplished by the apparatus shown in FIG. 6. The power current line 56 may be provided with a simple switch S for the purpose of periodically opening the circuit to the resistance heater in the plate. A radiant heat source may be provided with a switch for the same purpose.

The regulator R is adjusted to provide a plate temperature eventually well above the boiling point of the solvent. As the developmet process is initiated, power is applied to the plate, which causes the solvent to advance in the plate much more rapidly, with an accompanying increase in both resolution and speed of development. The plate eventually is heated to a temperature well above the solvent boiling point, with the result that the solvent completely evaporates from the plate. When the solvent has evaporated, switch S is operated to open the circuit, and the plate begins to cool. After sufficient cooling, the solvent begins to advance again in the plate, and heat is again applied. Each development cycle results in additional refinement of the previous cycle, with the result that greatly efficient separations may be carried out in a short period of time, with much better concentration within individual spots.

It will be noted that during the multiple development, the lower edge of the plate is not heated appreciably and remains immersed in the solvent. The remainder of the plate is simply heated until the rate of evaporation therefrom exceeds the rate at which new solvent enters the adsorbent by capillary forces. In an alternative, the edge of the plate may be raised out of contact with the solvent or the solvent level may be lowered. Also, as mentioned previously, the interior of the chamber may be flushed between cycles to hasten evaporation.

The above process may be rendered automatic by a timer, indicated schematically as T in FIG. 6, with the timer serving to start and stop the application of heat or flow of gas at predetermined intervals. In addition, a bypass line 58 containing a resistor 60 may be provided around the timer such that a small degree of heat is provided to the plate between successive heating cycles, which has been found generally to result in better efficiency by increasing the solvent diffusivity and by minimizing the extend to which the solvent must advance in successive cycles.

A further benefit resides in increasing the time interval within and between successive cycles in accordance with predetermined programs, in order to achieve types of programmed multiple development. Preferably, the length of successive developments increases in each cycle in order that the solvent advance will be progressively greater with each cycle.

Timed sequences may be established for various purposes, and examples of these will be described herein as Yield Mode, Distance Mode, and Intermediate Mode. The modes differ with respect to the number of unit increment times $\Delta t_i$ that comprise the total solvent advance time T. In each mode, reference may be made to a desired total number N of cycle and to the number $n$ of the current cycle. One cycle consists of solvent advance followed by solvent removal.

In the Yield Mode, the unit time increment for solvent advance $\Delta t_i$ increases by one with each successive cycle. Therefore, the time for development in any cycle in the sequence may be expressed as:

$$T_n = n \, \Delta t_i$$

and the cycles would follow the pattern of:

$$1\Delta t_i; \, 2\Delta t_i; \, 3\Delta t_i; \, 4\Delta t_1. \ldots$$

The total time for all cycles as:

$$T = N\Delta t_i.$$

Because the rate of solvent advance is inversely proportional to the distance of the solvent front from the solvent surface in the reservoir, it may be seen that the Yield Mode decreases the distance increment of solvent advance in each successive cycle. Thus, the Yield Mode causes an increasingly intensive refinement of resolution with increasing cycle number, but also mitigates increasingly against farther solvent advance. If the unit increment time $t_i$ is minimized, the maximum resoltuion possible is wrested in a minimum time from that minimum part of the thin layer bed nearest to the point of spot deposition. Spot spreading is also minimized in this mode, so that sensitivity is maximized as well. As a result, it is possible to obtain benefits in 5 cm of bed length that are superior in separation and sensitivity to those obtained with a 20 cm bed used in the conventional manner.

The Distance Mode emphasizes the inverse relationship of the solvent flow rate with the distance of the solvent front from the surface of the solvent in the reservoir, as described by Poiseuille's law. The time allowance in successive cycles increases sufficiently to produce substantially equal distance increments of solvent advance on each successive cycle. In this mode, the time required varies as the square of the distance, i.e., $$1\Delta t_i; \, 4\Delta t_i; \, 9\Delta t_i; \, 16\Delta t_i; \ldots$$

This mode emphasises the center-to-center separation of the spots, particularly of the leading spots.

In the Intermediate Mode, the time increment is between that defined by the Time and Distance Modes. A useful increment would be defined as:

$$T_n = [n \, (n+1)/2]$$

with times for successive cycles as:

$$1\Delta t_i; \, 3\Delta t_i; \, 6\Delta t_i; \, 10\Delta t_i; \ldots$$

A totally new effect made possible by the present invention is that of spot reconcentration by means of controlled evaporation. By means of temperature control, it is possible to achieve a reconcentration of spots at the solvent front in the bed during normal movement of the solvent by capillary forces. Reconcentration is accomplished by evaporating solvent from the solvent front at a rate which is slightly faster than the rate at which the front is advancing by normal capillary forces. As the solvent evaporates from the bed, the line of solvent front advance becomes slower and regresses toward the reservoir, moving against the unchanging forward direction of solvent flow. The continued movement of solvent toward the solvent front as a liquid and then out of the solvent front as a vapor results in a reconcentration of the spot at the front. The spot is carried forward by the solvent and redeposited in the line which is the receding front.

By adjusting the rate of solvent evaporation from the adsorbent bed, as herein described, it becomes possible to cause the solvent front to remain stationary against continued capillary flow, corresponding to continuous development, or to gradually regress, which will result in spot reconcentration at the receding front.

In general terms, it will be noted that since the rate of solvent flow, spot movement, and the rate of evaporation from the bed are all constantly changing variables, the changes in these variables will have to be correlated with the temperature of the system to achieve a steady solvent front regression.

Although spot reconcentration may be achieved in connection with all embodiments of the present invention, it is particularly feasible in connection with multiple development, since a reconcentration step may be carried out between periods of solvent advance.

In the third embodiment of the invention spatially uniform pressure is applied to the plate surface, with or without concurrent application of heat to the plate. Application of uniform pressure increases the temperature at which the solvent will evaporate, thereby allowing the use of higher solvent temperatures. It is also within the scope of this embodiment to employ uniform pressuure over a plate at ambient temperatures or below, where the boiling point of the solvent is below ambient temperature. It is also within the scope at this embodiment to employ uniform pressure over any adsorbent or absorbent bed, without regard to the shape of the bed. This includes an adsorbent bed in a tube, with pressure applied to both ends of the tube.

In the previous embodiments, the upper permissible temperature was limited substantially to the boiling point of the solvent at atmospheric pressure, or that point at which the solvent would leave the bed by evaporation faster than it would enter by capillary action. The application of pressure uniformly over the bed allows for an indefinite increase in temperature, which in turn exponentially increases the optimum velocity of solvent advance in the bed, with an accompanying increase in efficiency. For this reason, beds of extreme length may be employed with a vast increase in separation efficiency and theoretical plates. In fact, 150,000 to 600,000 theoretical plates may be obtained with the use of longer beds. Development times are reduced by factors of from tens to many thousands, compared to the time required for the same length bed in conventional practices.

The application of uniform pressures over the bed should be distinguished from other uses of pressure currently in use in chromatography. In some conventional practices, a pressure differential is created to cause a flow of gas or liquid through another medium. In the present invention, uniform pressure is employed to maintain the solvent in a liquid form and allow progression of solvent through the bed by normal capillary forces. Pressure is also employed in a secondary sense to control evaporation of the solvent, such as by reduction of pressure at high temperature to achieve rapid evaporation making possible programmed multiple development and spot reconcentration.

Apparatus for accomplishing the presently described embodiment is shown in simplified form in FIG. 9. A pressure vessel 61, which may take the form of a sealed cylinder having top and bottom caps, or other shape capable of withstanding high pressures, contains a thin layer plate, generally designated at 62. One or more ports 64 are provided in the vessel 61, one of which is connected to a pressurized or non-pressurized source S of gas. As mentioned previously, the gas is preferably selected to be nondestructive to the sample at high pressures and temperatures. Oxygen-free gases are preferable.

A special thin layer plate is provided to take advantage of the increased bed length made feasible by the present embodiment. The bed substrate is preferably in the form of a regular or oval rod or cylinder 64 having a helical band of adsorbent 66 deposited thereon. The bottom of the cylinder 64 rests in a recess 68 formed in the sealed base 70 of the cylinder. An inlet 72 in communication with the recess 68 and connected to an external pipe 74 allows for introduction of a quantity of solvent. The spot of mixture to be separated is deposited on the adsorbent band slightly above the solvent level in the recess.

A suitable resistance heating element 76, preferably tubular in form, is disposed axially within the thin layer cylinder 64 to provide for uniform heating of the internal tube surface, said element being connected to a suitable electrical line 78 leading to an external source of electrical power. The electrical line 78 may include a timing device T for obtaining multiple in situ development.

In operation, the interior of the vessel 61 is flushed with inert gas, recess 68 is filled with solvent, and the vessel is brought to the desired terminal pressure. Heating element 76 is then energized, which causes the thin layer tube to be heated. If desired, a variable pressure release valve shown as PR may be provided on the gas inlet 64 to obtain the desired pressure level and prevent buildup of excessive pressure.

The apparatus may be used for single developments or for multiple developments in accordance with the teachings of the previous embodiments. For example, a timer T may be connected to the electrical line 78 to achieve multiple development in any of the desired modes or variations thereof. In addition, a timed valve (VT) may be connected to the pressure line 64 in order to allow for sudden or gradual release of pressure from the vessel at predetermined intervals, which provides an added independent capacity for multiple development and spot reconcentration.

In normal operation, the chamber 61 is first brought up to a predetermined level and the heating element 76 is energized. The internal pressure is preferably maintained in the order of ten times the vapor pressure of the solvent at the higher temperature. Sufficient solvent is then injected through the inlet 74 to fill the recess 68, and development follows immediately in the heated, pressurized container.

The apparatus of FIG. 7 may also include a secondary housing 80 containing heating and/or cooling elements 82 for the purpose of heating or cooling the walls of the pressure vessel 61.

FIG. 10 illustrates another type of stationary phase that may be employed within the pressure apparatus of FIG. 9. A tube 84 of any desired cross section, is hollow and open at both ends and is filled with an absorbent material. When in use, a sample mixture is injected at one end of the tube and the end is immersed in the solvent. Since the pressure at both ends of the tube is substantially equal, there is no pressure differential and the solvent or mobile phase flows through the bed solely by capillary forces. Of course, the tube may be coiled in the form of a spiral or other configuration to save space.

FIGS. 11 and 12 show a tube 86 of polygonal cross section having separate individual bands or strips 88 of adsorbent deposited axially on the separate surfaces of the tube. The tube need not be shaped like a hexagon as shown, but may contain any desired number of surfaces. Also, the tube may be in the shape of a cylinder with a plurality of spaced strips of adsorbent deposited thereon, either axially or in a spiral fashion. The use of a plurality of parallel beds is advantageous for the simultaneous or comparative development of a plurality of samples.

In addition to the functions previously described, the apparatus of FIG. 9 may be connected to a vacuum pump to enable development or multiple development in connection with less than ambient pressures.

In summary, the apparatus shown in FIG. 9 is capable of operation at temperatures above or below ambient and at pressures above and below ambient, and at temperatures and pressures which are constant or changing. In addition, the apparatus is capable of virtually all forms of in situ multiple development and may include an extremely long bed of adsorbent or absorbent maintained at a uniform pressure, whenever such extra length is required.

It will be obvious to those skilled in the art that various modifications may be made to the apparatus and operating conditions of the presently described embodiments without departing from the scope and spirit of the invention as expressed in the appended claims.

I claim:

1. A process of performing an analysis on a material by thin layer chromatography comprising the steps of depositing a sample of said material upon a surface having a thin adsorbent layer, partially immersing said surface in a reservoir with said sample being located above the level of said liquid, allowing the liquid to advance through said adsorbent by capillary forces, and during such advance, varying the temperature of the liquid in said adsorbent by the application of heat, whereby to increase the diffusivity of said material in said liquid and to increase the speed of liquid advance.

2. The process of claim 1 wherein said liquid is heated to a value between ambient temperature and up to about the temperature at which the liquid totally evaporates from the adsorbent.

3. The process of claim 1 wherein said liquid is heated to a temperature above its boiling point at atmospheric pressure.

4. The process of claim 3 comprising the additional step of applying greater than ambient pressure substantially spatially uniformly over said surface to prevent prohibitive evaporation of the liquid from the adsorbent at higher than boiling point temperatures at atmospheric pressure.

5. The process of claim 4 wherein said pressure is alternatively increased and decreased.

6. The process of claim 1 wherein said temperature is alternatively increased and decreased.

7. The process of claim 4 wherein said temperature is alternatively increased and decreased.

8. The process of claim 5 wherein the temperature is alternatively increased and decreased.

9. The process of claim 1 wherein the liquid is heated by contacting a heating element with the surface having the adsorbent layer.

10. The process of claim 1 wherein the surface is heated by radiant energy.

11. The process of claim 1 comprising the further step of regulating the pressure above the adsorbent to regulate the degree of solvent evaporation therefrom.

12. The process of claim 11 wherein the pressure is regulated by means of contained pressurized gas above the adsorbent.

13. The process of claim 4 wherein said pressure is applied by means of contained pressurized gas above said surface.

14. The process of claim 1 comprising the further step of evaporating liquid from the absorbent layer by passing a gas over said layer.

15. A process of separating a multicomponent mixture by liquid-solid chromatography wherein the liquid advances along a front through a porous solid by capillary forces to separate the components of said mixture comprising the steps of first advancing said liquid front past the location of said mixture, then regressing the liquid front back toward said location, whereby to reconcentrate components of said mixture at said liquid front.

16. The process of claim 15 wherein said liquid front is advanced and regressed in a timed sequence.

17. The process of claim 15 wherein said liquid in said porous solid is cooled to cause it to regress therin.

18. A process of separating a multicomponent mixture by liquid-solid chromatography wherein the liquid advances along a front from one end of a porous solid by capillary forces to separate the components of said mixture, comprising the steps of placing a sample of said mixture in a concentrated location near said one end of said solid, contacting said one end with said liquid, allowing said liquid front to advance by capillary forces in said solid past said location, and while said end is in contact with said liquid, substantially completely evaporating said liquid above said location from said solid and then allowing said liquid front to again advance past said location.

19. The process of claim 18 wherein said liquid front is allowed to advance in increasingly greater distances past said location after each evaporation.

20. The process of claim 18 wherein said liquid front is caused to regress slowly toward said location between successive advances.

21. The process of claim 18 wherein the solvent is allowed to advance in units of time ($t$) for a given period of time, and the total time ($T$) allowed for solvent advance in any advance is related to the current number of advances ($n$) substantially as follows:

$$T = nt.$$

22. The process of claim 21 wherein the total time ($T$) allowed for solvent advance in any advance is related to the current number of advances ($n$) as follows:

$$T = ]n\,(n\ 1)/2\,]$$

23. The process of claim 21 wherein the total time ($T$) allowed for solvent advance in any advance is related to the current number of advances ($n$) as follows: $T = n^x t$, wherein $x$ is greater than 1.

24. The process of claim 23 wherein $x$ is substantially equal to 2.

25. An improvement in thin layer chromatography wherein a liquid moves from a reservoir by capillary action through a porous bed in contact with said liquid reservoir and containing a mixture in order to separate the mixture into its components, comprising the steps of disposing said porous bed in a pressure container, pressurizing said container and heating said bed, and then injecting liquid into said reservoir, whereby the diffusivity and speed of movement of said liquid in said bed is increased without prohibitive evaporation of liquid therefrom.

26. The improvement of claim 25 wherein said porous bed is disposed along a helical path from said reservoir.

27. The improvement of claim 25 wherein the container is pressurized to a value equal to approximately ten times the vapor pressure of the liquid at the higher temperature.

28. In a process of separating a multicomponent mixture by thin layer chromatography wherein a sample of the mixture is deposited upon a surface having a thin adsorbent layer, the surface is partially immersed in a reservoir of liquid, and the liquid advances through the adsorbent layer by capillary forces, the improvement in said process comprising the step of allowing the liquid to advance in said adsorbent, then evaporating substantially all of said liquid from said adsorbent without removing said surface from said reservoir, and then allowing the liquid to again advance in said adsorbent.

29. The process of claim 28 wherein the liquid is removed from said adsorbent by the application of heat thereto.

30. The process of claim 28 wherein the liquid is removed from said adsorbent by circulating a gas thereover.

31. The process of claim 30 wherein the gas is substantially free of oxygen.

32. Apparatus for thin layer chromatography wherein an edge of a plate having a thin layer of adsorbent is immersed in a reservoir of liquid, and the liquid advances from said edge into the adsorbent by capillary forces, comprising a chamber having exposed surfaces and adapted to be engaged against the plate to form an enclosure which is open at the bottom, and a vapor barrier secured near the bottom of said chamber above said reservoir and slightly spaced from said plate.

33. The apparatus of claim 32 wherein the surfaces of said chamber in engagement with said plate are porous.

34. The apparatus of claim 32 wherein said surfaces are beveled inward toward the interior of said chamber.

35. The apparatus of claim 32 further comprising means associated with said plate for heating said plate.

36. The apparatus of claim 35 wherein the means for heating said plate comprise a radiant heat source juxtaposed to the side of the plate opposite to that which bears the adsorbent layer.

37. The apparatus of claim 35 wherein the means for heating the plate comprises a heating element in contact with the plate.

38. The apparatus of claim 32 wherein means are provided for cooling the chamber.

39. The apparatus of claim 32 wherein means associated with said plate are provided for alternatively heating and cooling the plate.

40. The apparatus of claim 32 wherein means associated with said plate are provided for heating the plate until the liquid contained therein substantially completely evaporates.

41. The apparatus of claim 32 wherein means are provided for heating the plate in successive cycles.

42. The apparatus of claim 32 wherein means are provided for heating the plate to the degree that the liquid therein evaporates therefrom at a slightly faster rate than the liquid enters by capillary forces.

43. The apparatus of claim 32 wherein gas conduits are provided into said chamber.

44. Apparatus for thin layer chromatography comprising the combination of a first plate having an adsorbent layer of one surface thereof, a second plate having an adsorbent layer on one surface thereof, said plates being superimposed over each other with their adsorbent layers in contact, an edge of one of said plates projecting beyond the corresponding edge of the other plate and adapted to be immersed in a liquid bath, and a liquid flow barrier between the first and second plates around the perimeter thereof.

* * * * *